United States Patent
Tsuyoshi

[11] Patent Number: 5,495,920
[45] Date of Patent: Mar. 5, 1996

[54] BRAKING FORCE ADJUSTING APPARATUS FOR A BICYCLE

[75] Inventor: Sakashita Tsuyoshi, Sakai, Japan

[73] Assignee: Shimano, Inc., Osaka, Japan

[21] Appl. No.: 357,604

[22] Filed: Dec. 13, 1994

[30] Foreign Application Priority Data

Dec. 16, 1993 [JP] Japan ................. 5-67119 U

[51] Int. Cl.$^6$ .......................................... B62L 1/14
[52] U.S. Cl. ....................... 188/24.22; 188/24.19
[58] Field of Search .................. 188/24.19, 24.21, 188/24.22, 196 F, 196 M, 216

[56] References Cited

U.S. PATENT DOCUMENTS

| | | | |
|---|---|---|---|
| 4,754,853 | 7/1988 | Nagano | 188/24.19 |
| 4,793,444 | 12/1988 | Nagano | 188/24.19 X |
| 4,838,386 | 6/1989 | Yoshigai | 188/24.12 |
| 5,058,450 | 10/1991 | Yoshigai | 74/502.2 |
| 5,152,377 | 10/1992 | Yoshigai | 18/24.21 X |

FOREIGN PATENT DOCUMENTS

| | | | |
|---|---|---|---|
| 422240 | 4/1991 | European Pat. Off. | B62L 1/14 |
| 432268 | 6/1991 | European Pat. Off. | B62L 1/14 |
| 2-129985 | 10/1990 | Japan . | |
| 3-124034 | 12/1991 | Japan . | |
| 4-95587 | 8/1992 | Japan . | |

Primary Examiner—Josie Ballato
Attorney, Agent, or Firm—James A. Deland

[57] ABSTRACT

The present invention relates to an apparatus for adjusting biasing springs in a cantilever brake. A conventional apparatus for adjusting the biasing springs includes disks each engaging one leg of each spring, and adjusting screws each meshed with a proximal end of a brake caliper for contacting one of the disks. In the present invention, each biasing spring is engaged with a spring cover to which an adjusting screw is attached.

25 Claims, 4 Drawing Sheets

BRAKING FORCE ADJUSTING APPARATUS FOR A BICYCLE

BACKGROUND OF THE INVENTION

1. Field of the Invention

The present invention relates to an apparatus for adjusting a biasing force applied to brake calipers of a bicycle.

2. Description of the Related Art

A known bicycle brake includes brake calipers supporting brake shoes for contacting a rim of a bicycle wheel, and a biasing device such as springs for biasing the brake calipers in directions to move the brake shoes away from the rim.

A fine adjustment may be made to the biasing force of the springs to effect a fine adjustment of a spacing between the brake shoes and the rim.

Such a fine adjustment is made by an apparatus as disclosed in U.S. Pat. No. 4,754,853, for example. This brake includes brake calipers pivotally supported on brackets extending forward from bicycle frames, springs for applying a biasing force to the brake calipers, and a device for adjusting the biasing force of each spring. This adjusting device includes a disk rotatably attached to each bracket and engaging one leg of each spring, and an adjusting screw meshed with a bore formed in each brake caliper for contacting the disk. This brake further includes covers substantially enclosing the biasing springs to protect the springs and to provide an improved outward appearance.

The prior brake requires, besides the adjusting screws, the disks for engaging the legs of the springs, which increase the number of components and complicate the construction and assembly work. This results in the disadvantage of a relatively high cost.

SUMMARY OF THE INVENTION

Having regard to the disadvantage of the prior an noted above, a bicycle brake attached to brackets fixed to bicycle frames, according to the present invention, comprises brake calipers each pivotally supported by one of the brackets and supporting a brake shoe, covers each pivotally supported by one of the brackets and defining a space with the one of the brackets, a biasing spring mounted in the space, and having a first leg thereof attached to one of the covers and a second leg attached to one of the brackets to bias one of the brake calipers, a screw holder formed integral with each of the covers, an adjusting screw meshed with the screw holder, and a contact portion formed on each of the brake calipers for contacting the adjusting screw.

Thus, the present invention dispenses with the disks by fixing one end of each biasing spring to one of the covers required in this type of brake. This results in a reduced number of components, and contributes to low cost and labor saving in assembling the components.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

Figure 1:
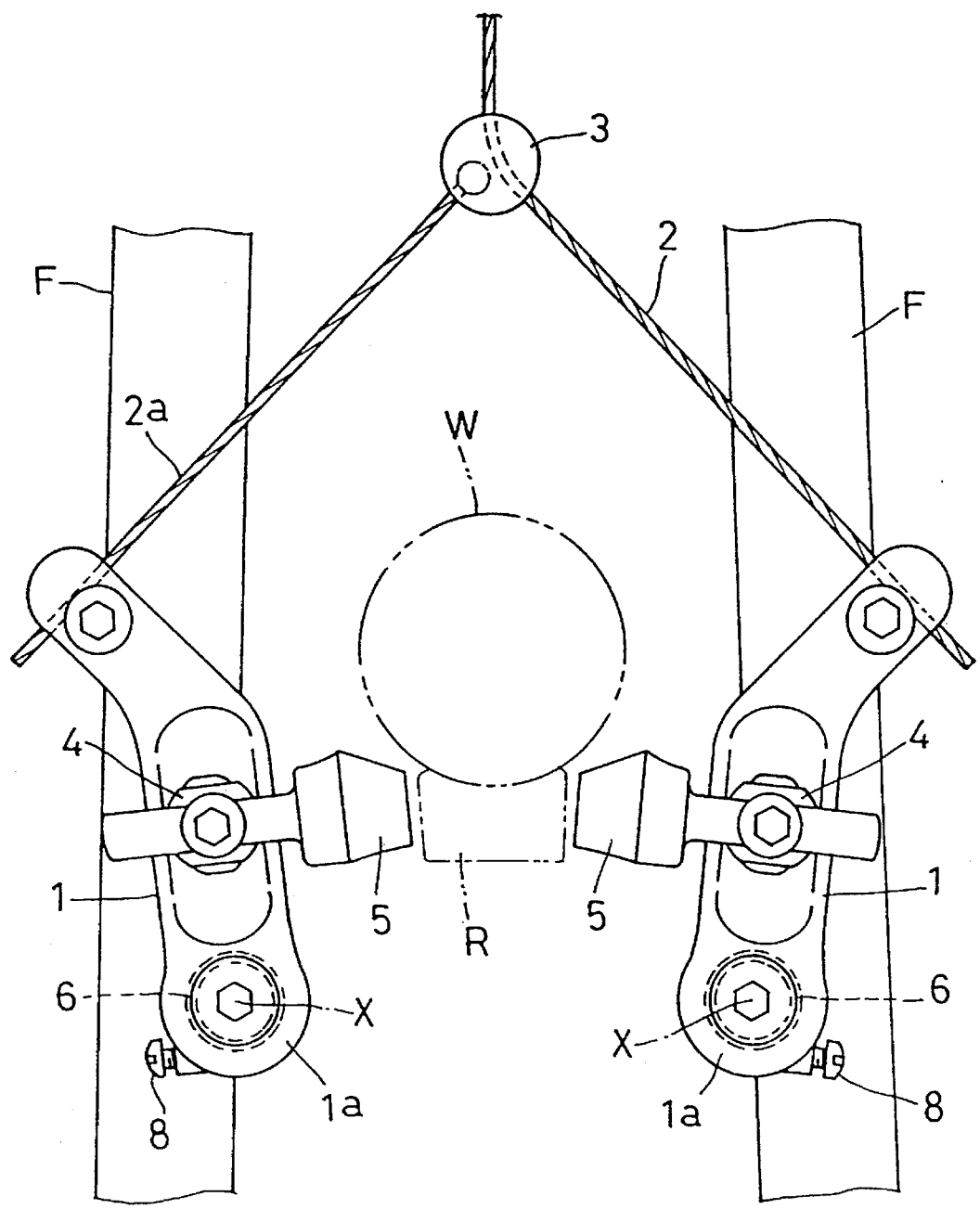
FIG. 1 is a view of a cantilever brake seen from the front of a bicycle.

FIG. 1 shows a cantilever type brake seen from the front of a bicycle. This brake is substantially symmetrical about a bicycle wheel W. As used in this specification, the terms forward, rearward, upward and downward are directions referring to the bicycle. This brake includes a pair of brake calipers 1 attached to bicycle frames F supported by a front wheel. Each of the brake calipers 1 is pivotable relative to the frame F about an axis X. Each brake caliper 1 has a brake shoe 5 attached thereto. Further, a control cable is connected to a free end of each brake caliper 1. A brake cable 2 is connected to the caliper 1 at the right side in FIG. 1, while an auxiliary cable 2a is connected to the caliper 1 at the left side. The auxiliary cable 2a is fixed at an upper end thereof to a connector 3.

Each brake caliper 1 is biased away from a rim R opposed to the brake shoe 5, by a spring 6 acting as a biasing device. Thus, when the brake cable 2 is pulled, the connector 3 pulls also the auxiliary cable 2a, whereby both the right and left brake calipers 1 pivot toward the rim R of the wheel against the biasing forces. As a result, the brake shoes 5 contact the rim R to apply friction brakes thereto.

When the brake cable 2 is relaxed, the brake shoes 5 move away from the rim R under the biasing forces of the springs 6 acting on the brake calipers 1.

The biasing springs 6 are attached to proximal ends 1a of the brake calipers 1, respectively. An adjusting device is provided for adjusting the biasing force of each spring 6.

The biasing force adjusting device according to the present invention will be described in detail hereinafter with reference to FIGS. 2 through 4. Since the right part and left part of the brake in FIG. 1 are the same, the adjusting device will be described in relation to the right part of the brake only.

Figure 3:
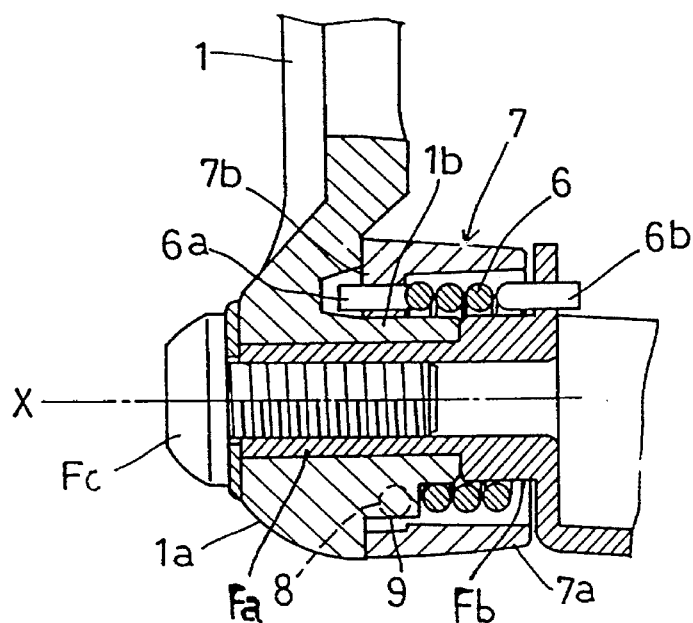
FIG. 3 is a sectional view taken on line A—A' of FIG. 2.
Figure 4:
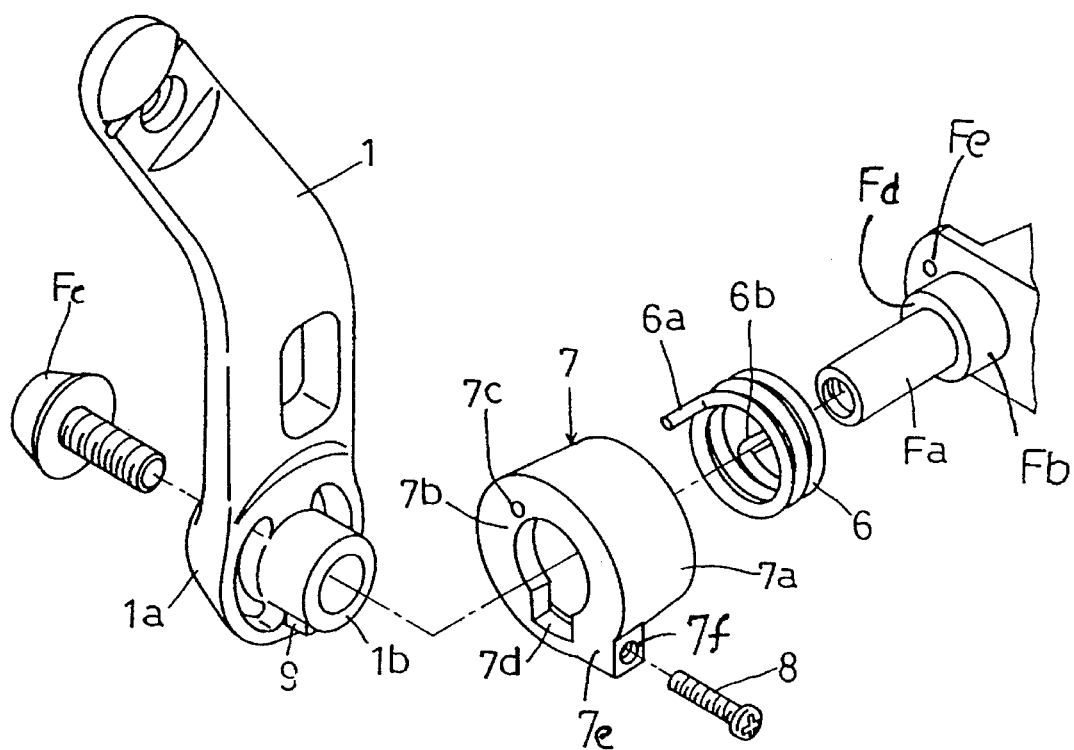
FIG. 4 is a perspective view of an adjusting device of a brake caliper biasing mechanism according to the present invention.

References Fa and Fb in FIG. 4 denote a mounting bracket fixed to the frame F. The bracket includes a large diameter cylindrical portion Fb, and a small diameter cylindrical portion Fa extending forwardly thereof. A shoulder Fd is formed between the large diameter cylindrical portion Fb and small diameter cylindrical portion Fa. The small diameter cylindrical portion Fa is hollow, and has a threaded inner surface. The biasing spring 6 is an ordinary coil spring having two legs 6a and 6b. These legs 6a and 6b extend substantially perpendicular to a coiled portion. The bracket defines a bore Fe adjacent the large diameter cylindrical portion Fb for securing the second leg 6b of the biasing spring 6. As shown in FIG. 3, the biasing spring 6 is fitted around the bracket Fa, Fb.

A spring cover 7 has an overall shape of a hollow cylinder, including a cylindrical portion 7a and a vertical surface 7b at right angles to an axis X thereof. The spring cover 7 is rotatably attached to the bracket Fa, Fb. The vertical surface 7b defines a circular bore, and a cutout 7d extending radially outwardly of the circular bore. The vertical surface 7b includes a holder portion 7e for receiving an adjusting screw 8 for adjusting tension of the spring 6. The holder portion 7e has a threaded bore 7f extending tangentially of the cylindrical portion 7a. The bore 7f extends to the cutout 7d, and the adjusting screw 8 is meshed with the bore 7f.

The vertical surface 7b of the spring cover 7 further includes a bore 7c for receiving the first leg 6a of the biasing spring 6.

As shown in FIG. 3, when the spring cover 7 is attached to the bracket, a space is formed between the bracket and spring cover 7 for accommodating the biasing spring 6. Thus, the spring cover 7 has functions to protect the biasing spring 6 and to house the adjusting screw 8 used to adjust tension of the biasing spring 6.

As shown in FIG. 4, the brake caliper 1 is the cantilever type having a cylindrical portion 1b formed rearwardly of the proximal end 1a thereof. This cylindrical portion 1b has an outside diameter substantially corresponding to an inside diameter of the circular bore formed in the vertical surface 7b of the spring cover 7. The cylindrical portion 1b includes a contacting projection 9 formed in a lower peripheral position thereof as shown in FIG. 4. The contacting projection 9 extends radially outwardly of the axis X. When the brake caliper 1 is attached to the bracket, the contacting projection 9 extends into the cutout 7d of the spring cover 7 to contact a forward end of the adjusting screw 8. The contacting projection 9 has a smaller width than the cutout 7d to enable adjustment of the force of biasing spring 6 by the contact between the contacting projection and adjusting screw 8. As shown in FIG. 3, a difference between inside diameter and outside diameter, i.e. the thickness, of the cylindrical portion 1b of the brake caliper 1 substantially corresponds to a difference between an outside diameter of the small diameter portion Fa and an outside diameter of the large diameter portion Fb of the bracket. Consequently, an outer surface of the cylindrical portion 1b of the brake caliper 1 is smoothly continuous with an outer surface of the large diameter portion Fb of the bracket. Further, the cylindrical portion 1b of the brake caliper 1 substantially corresponds in length to the small diameter portion Fa of the bracket. A rear end of the cylindrical portion 1b of the brake caliper 1 is in contact with the shoulder Fd of the bracket.

When assembling this brake mechanism, the cylindrical portion 1b of the brake caliper 1 is inserted into the bore formed in the vertical surface 7b of the spring cover 7. At this time, the contacting projection 9 of the brake caliper 1 is placed in the cutout 7d of the vertical surface 7b. Then, the first leg 6a of the biasing spring 6 is inserted into the bore 7c of the vertical surface 7b of the spring cover 7. Subsequently, the brake caliper 1, spring cover 7 and biasing spring 6 are attached to the bracket Fa, Fb. At this time, the second leg 6b of the biasing spring 6 is inserted into the bore Fe of the bracket. Then, these components are fastened together by a clamp screw Fc. The clamp screw Fc has a forward end meshed with the threaded inner surface of the bracket Fa.

Figure 2:
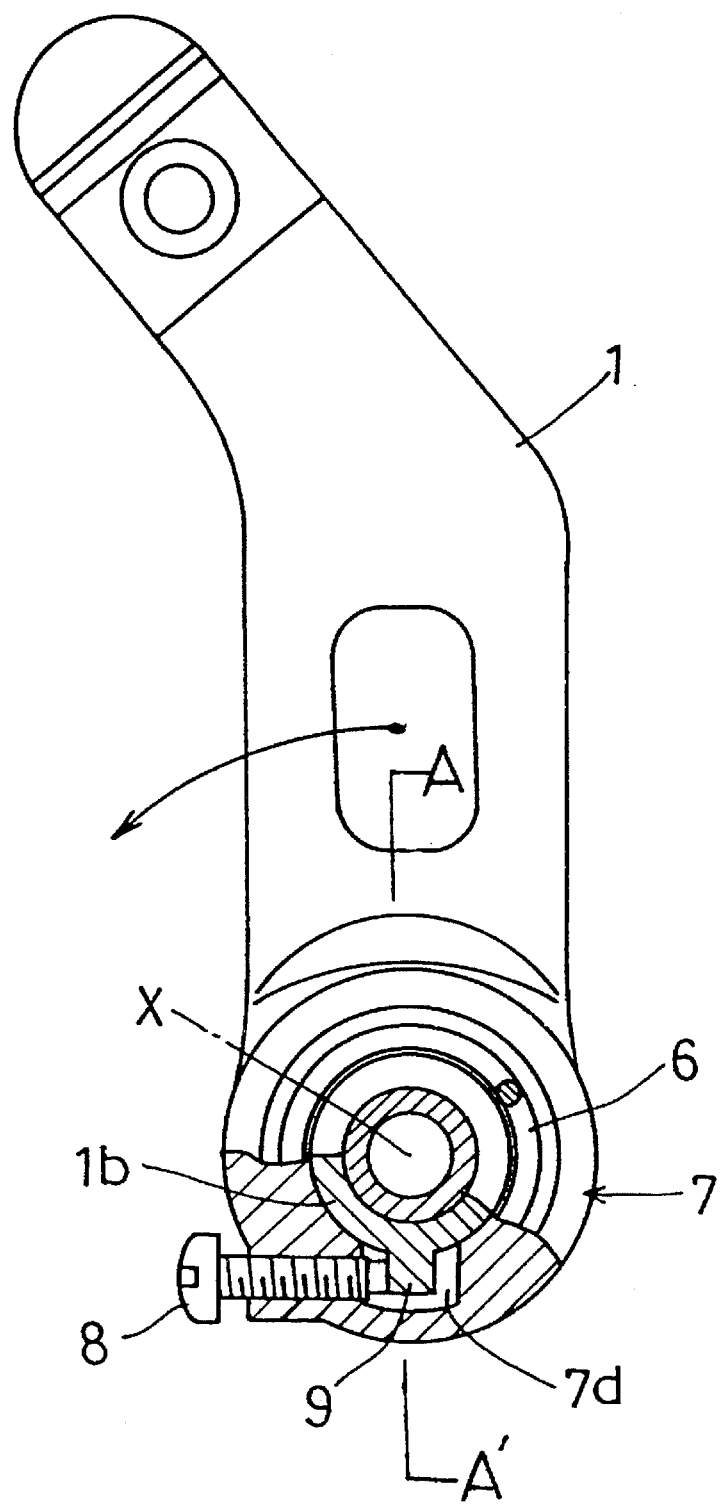
FIG. 2 is a rear view, partly in section, of a right brake caliper of the cantilever brake shown in FIG. 1.

FIG. 2 shows the righthand brake caliper 1 of FIG. 1 as seen in a forward direction from the cyclist. In this figure, the biasing spring 6 biases the spring cover 7 counterclockwise (in the direction of an arrow). The biasing force is transmitted to to the brake caliper 1 through the spring cover 7 and adjusting screw 8. Consequently, the brake caliper 1 supports and biases the brake shoe 5 away from the rim R. This biasing force is adjustable simply by turning the adjusting screw 8.

In the brake according to the present invention, as described above, one leg of each biasing spring 6 is attached to the spring cover 7. Thus, the spring cover 7, which has been a necessary component in the prior art also, is now effectively utilized to reduce the number of components. Further, the force of the biasing spring 6 may be adjusted without manipulating the clamp bolt Fc.

Figure 5:
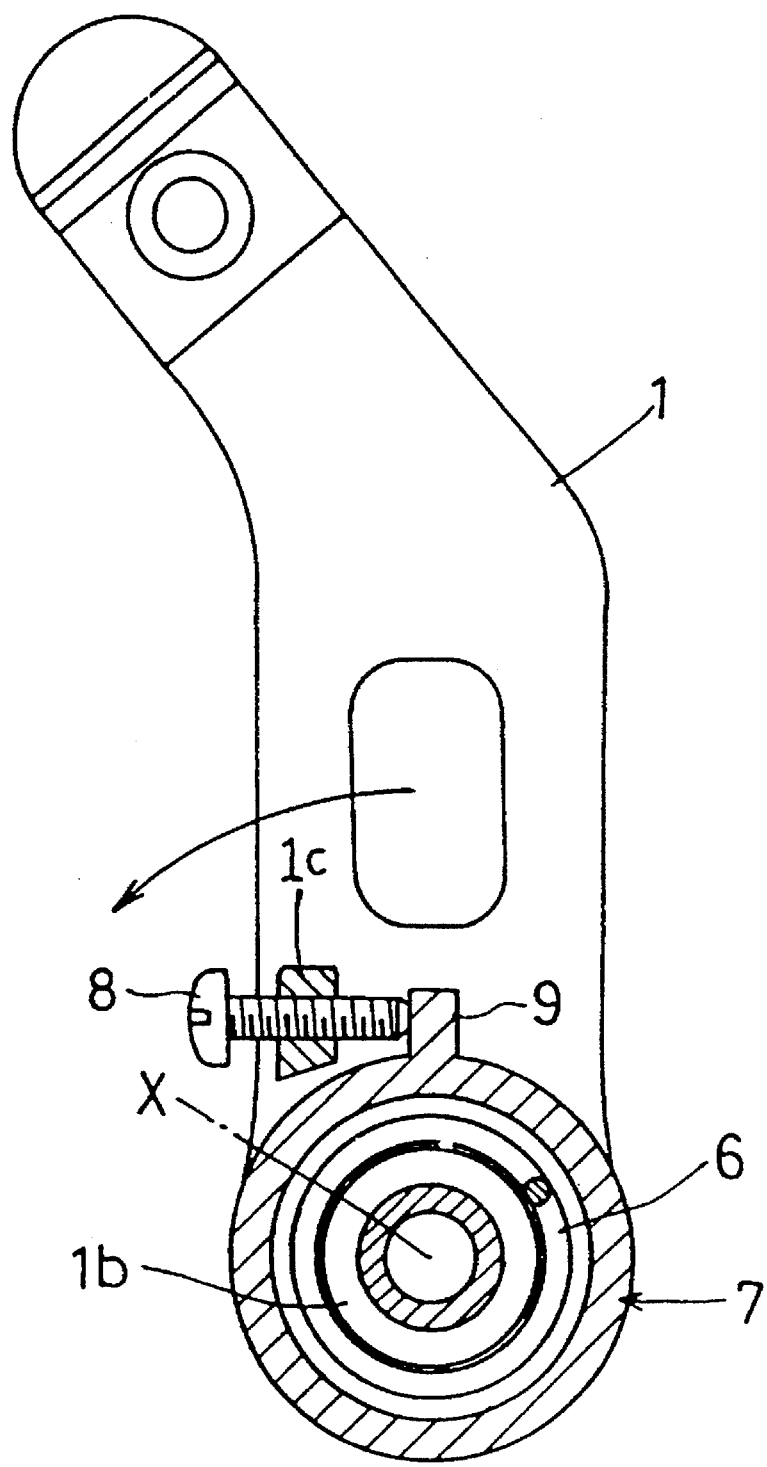
FIG. 5 is a view similar to FIG. 2 and showing a modified adjusting device of a brake caliper biasing mechanism.

FIG. 5 shows a modified embodiment of the present invention. In this embodiment, each brake caliper 1 includes an adjusting screw holder 1c. This adjusting screw holder 1c is in the form of a projection having a threaded bore for meshing with an adjusting screw 8. A spring cover 7 includes a projection 9 for contacting the adjusting screw 8. This projection 9 extends radially outwardly of a pivotal axis of the brake caliper 1.

What is claimed is:

1. A brake assembly for attachment to a bracket fixed to a bicycle comprising:

a brake caliper for pivotally mounting to said bracket;

a cover for pivotally mounting to said bracket between said brake caliper and said bracket, wherein said cover is movable relative to said brake caliper;

a biasing spring having a first leg attached to said cover and a second leg for attachment to said bracket;

a screw holder formed on said cover;

an adjusting screw meshed with said screw holder; and a contact portion formed on said brake caliper for contacting said adjusting screw.

2. A brake assembly according to claim 1 wherein said screw holder includes a threaded bore formed in said cover.

3. A brake assembly according to claim 2 wherein an end face of said screw presses against said contact portion so that, when said screw is turned in said threaded bore, said cover moves relative to said brake caliper by an amount substantially equal to the advancement of said screw in said threaded bore.

4. A brake assembly according to claim 1 wherein said brake caliper pivots about an axis, and wherein said contact portion extends radially outwardly from said axis.

5. A brake assembly according to claim 1 wherein said brake caliper pivots about an axis, wherein said brake caliper includes a cylindrical portion extending in the direction of said axis, and wherein said contact portion comprises a contact projection extending from a side of said cylindrical portion and radially outwardly from said axis.

6. A brake assembly according to claim 5 wherein said cover defines a cutout for receiving said contact projection.

7. A brake assembly according to claim 5 wherein said cover defines an abutment which abuts against said contact projection when said cover is in a prescribed position relative to said brake caliper.

8. A brake assembly according to claim 5 wherein said cover has a generally cylindrical shape and has an end surface extending generally perpendicular to said axis, said end surface including a bore for receiving said cylindrical portion and a cutout for receiving said contact projection.

9. A brake assembly according to claim 8 wherein said screw holder is disposed adjacent to said end surface.

10. A brake assembly according to claim 8 wherein said end surface includes a bore for receiving said first leg of said biasing spring.

11. A brake assembly for attachment to a bracket fixed to a bicycle comprising:

a brake caliper for pivotally mounting to said bracket, wherein said brake caliper pivots about an axis;

a cover for pivotally mounting to said bracket with said brake caliper, wherein said cover is movable relative to said brake caliper;

a biasing spring having a first leg received by said cover and a second leg, the biasing spring being attached so that, when said cover moves relative to said brake caliper, a biasing force of said biasing spring applied to said brake caliper is varied; and wherein said cover has a generally cylindrical shape and has a portion defining a bore for receiving said first leg of said spring.

12. A brake assembly according to claim 11 further comprising:

a screw holder formed on said cover;

an adjusting screw meshed with said screw holder; and a contact potion formed on said brake caliper for contacting said adjusting screw.

13. A brake assembly according to claim 12 wherein said screw holder includes a threaded bore formed in said cover.

14. A brake assembly according to claim 13 wherein an end face of said screw presses against said contact portion so that, when said screw is turned in said threaded bore, said cover moves relative to said brake caliper by an amount substantially equal to the advancement of said screw in said threaded bore.

15. A brake assembly according to claim 12 wherein said contact portion extends radially outwardly from said axis.

16. A brake assembly according to claim 15 wherein said cover defines a cutout for receiving said contact portion.

17. A brake assembly according to claim 15 wherein said cover defines an abutment which abuts against said contact portion when said cover is in a prescribed position relative to said brake caliper.

18. A brake assembly according to claim 15 wherein said screw holder is disposed adjacent to said end surface.

19. A brake assembly according to claim 12 wherein said brake caliper includes a cylindrical portion extending in the direction of said axis, and wherein said contact portion comprises a contact projection extending from a side of said cylindrical portion and radially outwardly from said axis.

20. A brake assembly according to claim 19 wherein said cover defines a cutout for receiving said contact projection.

21. A brake assembly according to claim 19 wherein said cover defines an abutment which abuts against said contact projection when said cover is in a prescribed position relative to said brake caliper.

22. A brake assembly according to claim 19 wherein said end surface of said cover includes a bore for receiving said cylindrical portion and a cutout for receiving said contact projection.

23. A brake assembly according to claim 22 wherein said screw holder is disposed adjacent to said end surface.

24. A brake assembly for attachment to a bracket fixed to a bicycle comprising:

a brake caliper for pivotally mounting to said bracket, wherein said brake caliper pivots about an axis;

a cover for pivotally mounting to said bracket between said brake caliper and said bracket, wherein said cover is movable relative to said brake caliper;

a biasing spring having a first leg received by said cover and a second leg, the biasing spring being attached so that, when the cover moves relative to said brake caliper, a biasing force of said biasing spring applied to said brake caliper is varied;

a screw holder formed on said brake caliper;

an adjusting screw meshed with said screw holder;

a contact portion formed on said cover for contacting said adjusting screw; and wherein said cover has a generally cylindrical shape and has an end surface extending generally perpendicular to said axis, said end surface including a bore for receiving said first leg of said spring.

25. A brake assembly according to claim 24 wherein said contact portion extends radially outwardly from said cover.

* * * * *